US011551895B2

(12) United States Patent
Namikawa

(10) Patent No.: US 11,551,895 B2
(45) Date of Patent: Jan. 10, 2023

(54) BREAKER, SAFETY CIRCUIT AND SECONDARY BATTERY PACK

(71) Applicant: BOURNS KK, Osaka (JP)

(72) Inventor: Masashi Namikawa, Osaka (JP)

(73) Assignee: BOURNS KK, Osaka (JP)

( * ) Notice: Subject to any disclaimer, the term of this patent is extended or adjusted under 35 U.S.C. 154(b) by 0 days.

(21) Appl. No.: 17/269,979

(22) PCT Filed: Aug. 19, 2019

(86) PCT No.: PCT/JP2019/032269
§ 371 (c)(1),
(2) Date: Feb. 19, 2021

(87) PCT Pub. No.: WO2020/045144
PCT Pub. Date: Mar. 5, 2020

(65) Prior Publication Data
US 2021/0313129 A1 Oct. 7, 2021

(30) Foreign Application Priority Data
Aug. 27, 2018 (JP) .............................. JP2018-158064

(51) Int. Cl.
*H01H 37/54* (2006.01)
*H01H 37/64* (2006.01)
(Continued)

(52) U.S. Cl.
CPC ........ *H01H 37/5436* (2013.01); *H01H 37/64* (2013.01); *H01M 10/425* (2013.01);
(Continued)

(58) Field of Classification Search
CPC ............... H01H 37/5436; H01H 37/64; H01H 2205/002; H01H 37/5427; H01H 37/54;
(Continued)

(56) References Cited

U.S. PATENT DOCUMENTS

2014/0285308 A1* 9/2014 Namikawa ............. H01H 37/54
337/398
2016/0035521 A1* 2/2016 Namikawa ......... H01H 37/5427
337/380
(Continued)

FOREIGN PATENT DOCUMENTS

JP 2006-100054 A 4/2006
JP 2013-222533 A 10/2013
(Continued)

OTHER PUBLICATIONS

Namikawa Katsufumi, "Breaker, Safety Circuit Including Breaker, and Secondary Battery Including Breaker", Feb. 24, 2014, Komatsulite MFG Co. LTD, Entire Document (Translation of JP 2014035993). (Year: 2014).*

(Continued)

*Primary Examiner* — Stephen S Sul
(74) *Attorney, Agent, or Firm* — Knobbe, Martens, Olson & Bear, LLP

(57) ABSTRACT

The breaker is provided with a fixed contact, a movable piece having an elastic portion and a movable contact, a thermally-actuated element deforming with a change in the temperature so as to shift the movable piece from a conduction state to a cut-off state, a case main body housing the movable piece and the thermally-actuated element, a lid member attached to the case main body, and a plate-shaped cover piece embedded in the lid member. The case main body is provided with a first fixing surface fixed to the lid member, and the lid member is provided with a second fixing surface fixed to the case main body. The second fixing surface is provided with a protruding portion protruding toward the first fixing surface, and the protruding portion and the cover piece are overlapped with each other in the
(Continued)

plan view as viewed in the thickness direction of the cover piece.

8 Claims, 8 Drawing Sheets

(51) Int. Cl.
*H01M 50/581* (2021.01)
*H01M 10/42* (2006.01)

(52) U.S. Cl.
CPC .... *H01M 50/581* (2021.01); *H01H 2205/002* (2013.01); *H01M 2200/101* (2013.01); *H01M 2200/106* (2013.01)

(58) Field of Classification Search
CPC ............. H01M 10/425; H01M 50/581; H01M 2200/101; H01M 2200/106; Y02E 60/10
See application file for complete search history.

(56) References Cited

U.S. PATENT DOCUMENTS

| 2016/0035522 A1* | 2/2016 | Namikawa | H01H 37/52 337/362 |
| 2021/0210297 A1* | 7/2021 | Namikawa | H01H 11/00 |

FOREIGN PATENT DOCUMENTS

| JP | 2014035993 A * | 2/2014 |
| JP | 2015-162448 A | 9/2015 |
| JP | 2016-39122 A | 3/2016 |
| JP | 2016-51594 A | 4/2016 |
| WO | WO 2011/105175 A1 | 9/2011 |

OTHER PUBLICATIONS

International Search Report for PCT/JP2019/032269 dated Oct. 8, 2019.

* cited by examiner

BREAKER, SAFETY CIRCUIT AND SECONDARY BATTERY PACK

TECHNICAL FIELD

The present invention relates to a minisize circuit breaker and others suitable for use in a safety circuit of an electrical equipment.

BACKGROUND TECHNOLOGY

Conventionally, a breaker has been used as a protection device (safety circuit) for a secondary battery, a motor and the like of various electrical equipments.
When an abnormality occurs, e.g. when the temperature of a secondary battery during charging/discharging rises excessively, or when an overcurrent flows through a motor or the like installed in an equipment of an automobile, a home appliance or the like, the breaker cuts off the current to protect the secondary battery, motor and the like.
The breaker used as such a protection device is required to operate accurately (to have good temperature characteristics) in accordance with temperature changes in order to ensure the safety of the equipment as well as to have a stable resistance value when the current flows through.

The breaker is provided with a thermally-actuated element which, according to the temperature change, operates to conduct or cut off the current.

Patent Document 1 discloses a breaker using a bimetal as a thermally-actuated element. A bimetal is an element, which is formed by laminating two types of plate-shaped metal materials having different coefficients of thermal expansion, and which changes its shape according to the temperature change to control the conduction state of the contacts.
The breaker disclosed in this document is formed by housing in its case, a fixed piece, a movable piece, a thermally-actuated element, a PTC thermistor and the like. And terminals of the fixed piece and movable piece protrude from the case to be connected to an electric circuit of an electrical equipment in order to use the breaker.

PRIOR ART DOCUMENT

Patent document

Patent Document 1: Japanese Patent Application Publication No. 2016-51594

SUMMARY OF THE INVENTION

Problems to be Solved by the Invention

On the other hand, when a breaker is used as a protection device for a secondary battery provided in an electrical equipment, e.g. a notebook size personal computer, a tablet type portable information terminal device, a thin multifunctional mobile phone called smartphone and the like, miniaturization is required for the breaker in addition to the safety as described above.

In recent years, especially, users have a strong desire for miniaturization (thinness) of portable information terminal devices, therefore, devices newly released on the market by various manufacturers have a pronounced tendency to be designed to be compact in order to ensure superiority in the design. Against such background, a breaker which is mounted together with a secondary battery as a component constituting a portable information terminal device is also strongly required to be further miniaturized.

In the breaker disclosed in Patent Document 1, the movable piece, the thermally-actuated element and the PTC thermistor are housed through an opening provided in the case main body.
A lid member is attached to the opening of the case main body in which the movable piece, the thermally-actuated element and the PTC thermistor have been housed, and a first fixing surface of the case main body and a second fixing surface of the lid member are fixed by ultrasonic welding or the like. (See paragraph [0032] of the document)

The second fixing surface is provided, in a region slightly inside of the outer edge of the lid member, with a protruding portion which protrudes in the form of a rib, and extends continuously along the outer edge.
During ultrasonic welding, the protruding portion is melted, and thereby, good adhesion between the first fixing surface and the second fixing surface is obtained. (See paragraph [0043] of the document)

In the case of a breaker that has been miniaturized to the limit of miniaturization, however, during ultrasonic welding, the lid member is bent, and the pressure acting on the top of the protruding portion decreases, therefore, there is a possibility that good adhesion can not be obtained between the first fixing surface and the second fixing surface, and the rigidity and strength of the case become insufficient.

The present invention was made in order to solve the above problems, and a primary object of the present invention is to provide a breaker in which its case can be provided with good rigidity and strength even if the breaker is miniaturized to the utmost limit.

Means for Solving the Problems

In order to achieve the above object, a first invention of the present invention is a breaker
provided with
    a fixed contact,
    a movable piece, which has an elastic portion formed in a plate shape and elastically deformable, and a movable contact formed in one end portion of the elastic portion, and which is for pressing the movable contact against the fixed contact,
    a thermally-actuated element deforming with a change in the temperature so as to shift the movable piece
from a conduction state in which the movable contact contacts with the fixed contact
to a cut-off state in which the movable contact is separated from the fixed contact,
    a first resin case having an opening for housing the movable piece and the thermally-actuated element,
    a second resin case mounted on the first resin case in order to close the opening, and
    a plate-shaped cover piece embedded in the second resin case,
and characterized in that
    the first resin case is provided with
a first fixing surface fixed to the second resin case, and formed continuously around the opening,
    the second resin case is provided with a second fixing surface fixed to the first resin case, and formed continuously facing the first fixing surface, the second fixing surface is provided with a protruding portion protruding toward the first fixing surface, and the protruding portion and the cover piece are at least partially overlapped with each other in a plan view of the cover piece viewed in its thickness direction.

A second invention of the present invention is a breaker provided with a fixed contact, a movable piece, which has an elastic portion formed in a plate shape and elastically deformable, and a movable contact formed in one end portion of the elastic portion, and which is for pressing the movable contact against the fixed contact, a thermally-actuated element deforming with a change in the temperature so as to shift the movable piece from a conduction state in which the movable contact contacts with the fixed contact to a cut-off state in which the movable contact is separated from the fixed contact, a first resin case having an opening for housing the movable piece and the thermally-actuated element, a second resin case mounted on the first resin case in order to close the opening, and a plate-shaped cover piece embedded in the second resin case, and characterized in that the first resin case is provided with a first fixing surface fixed to the second resin case, and formed continuously around the opening, the second resin case is provided with a second fixing surface fixed to the first resin case, and formed continuously facing the first fixing surface, the first fixing surface is provided with a protruding portion protruding toward the second fixing surface, and the protruding portion and the cover piece are at least partially overlapped with each other in a plan view of the cover piece viewed in its thickness direction.

In the breaker according to the present invention, it is desirable that the opening includes a rectangular area which is formed in a rectangular shape in the above-said plan view, and the protruding portion and the cover piece are overlapped with each other in regions which are adjacent to four corners of the rectangular area on outer sides thereof in the plan view.

In the breaker according to the present invention, it is desirable that the second resin case is formed in a rectangular shape which is longer in the longitudinal direction of the movable piece in the plan view, and the protruding portion has first portions extending linearly along the opening in parallel with long sides of the second resin case, and second portions continued from the first portions, and bent inward in a short direction of the movable piece in the above-said adjacent regions.

In the breaker according to the present invention, it is desirable that the second portions and the cover piece are overlapped with each other in the plan view.

In the breaker according to the present invention, it is desirable that the protruding portion has third portions continued from the second portions, and disposed inward in the short direction than the first portions, and extending linearly in parallel with the first portions.

According to the present invention, a safety circuit for an electrical equipment is characterized by including the above-said breaker.

According to the present invention, a secondary battery circuit is characterized by including the above-said breaker.

Effect of the Invention

According to the breaker of the first invention, the first resin case is provided with the first fixing surface continuously formed around the opening, and the second resin case is provided with the second fixing surface continuously formed facing the first fixing surface. The protruding portion which is formed on the second fixing surface to protrude toward the first fixing surface, is melted at the time of ultrasonic welding, and provides good adhesion between the first fixing surface and the second fixing surface. The plate-shaped cover piece embedded in the second resin case suppresses the bending of the second resin case during ultrasonic welding.

Further, in the first invention, since the protruding portion and the cover piece are at least partially overlapped with each other in the plan view, the pressure acting on the top of the protruding portion is suppressed from decreasing, and even better adhesion is obtained between the first fixing surface and the second fixing surface.

According to the breaker of the second invention, the first resin case is provided with the first fixing surface continuously formed around the opening, and the second resin case is provided with the second fixing surface continuously formed facing the first fixing surface. The protruding portion which is formed on the first fixing surface to protrude toward the second fixing surface, is melted at the time of ultrasonic welding, and provides good adhesion between the first fixing surface and the second fixing surface. The plate-shaped cover piece embedded in the second resin case suppresses the bending of the second resin case during ultrasonic welding.

Further, in the second invention, since the protruding portion and the cover piece are at least partially overlapped with each other in the plan view, the pressure acting on the top of the protruding portion is suppressed from decreasing, and even better adhesion is obtained between the first fixing surface and the second fixing surface.

DETAILED DESCRIPTION

First Invention

A breaker as an embodiment of a first invention of the present invention will be described with reference to the drawings.

Figure 1:
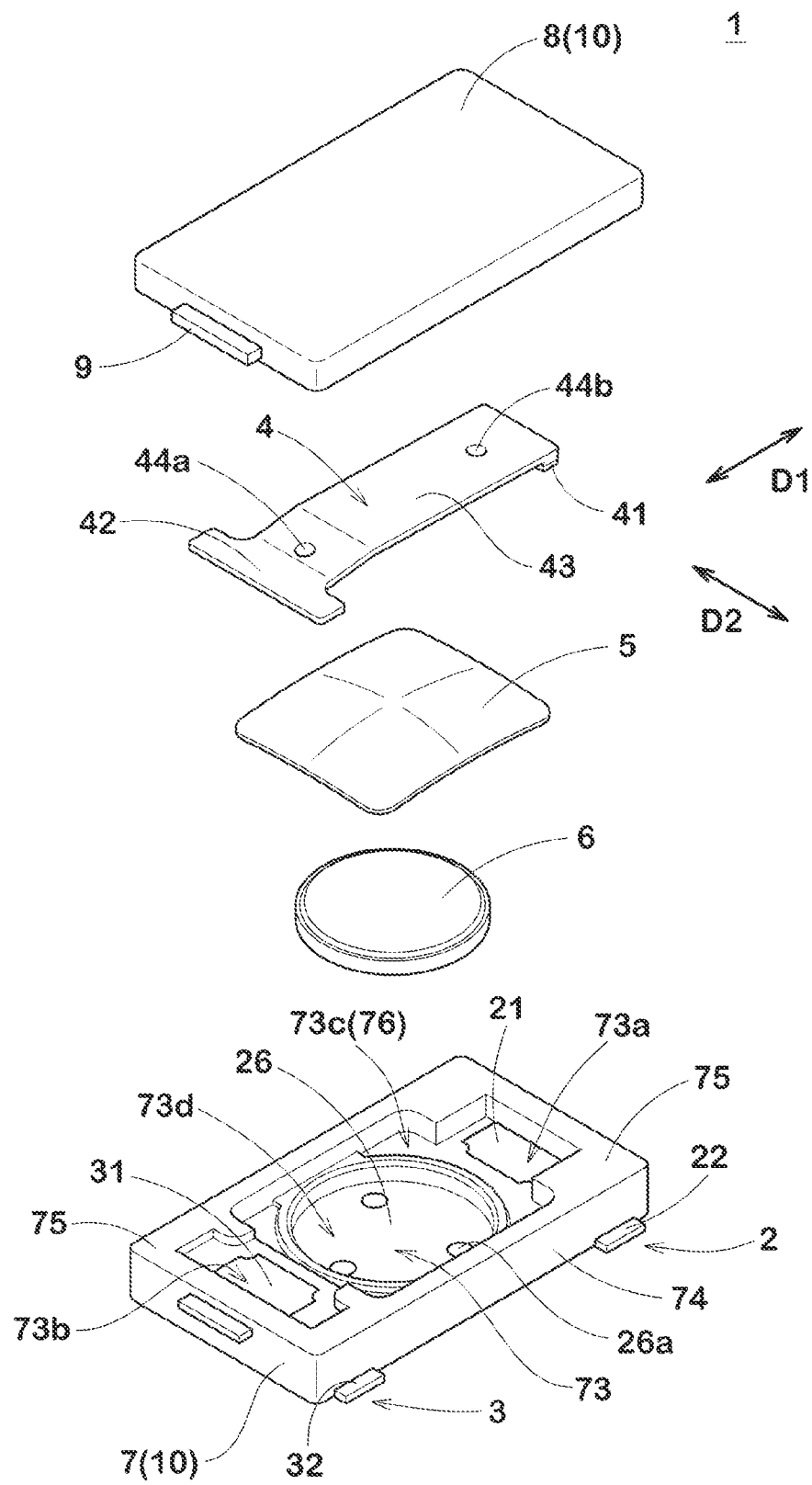
FIG. 1 is a perspective view of a breaker as an embodiment of the first invention showing its schematic configuration before assembled.
Figure 2:
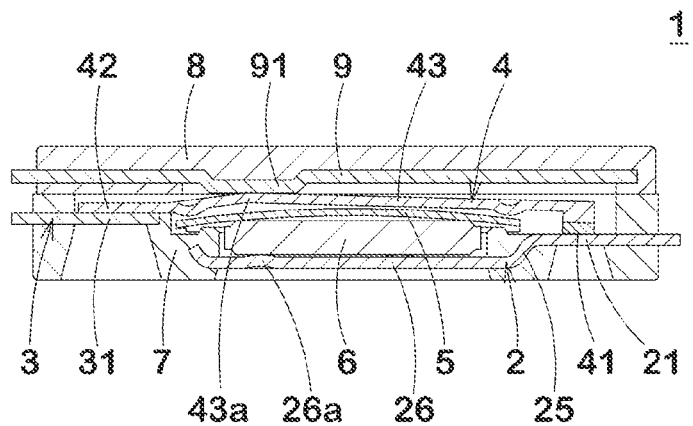
FIG. 2 is a cross-sectional view showing the breaker in its normal charging/discharging state.
Figure 3:
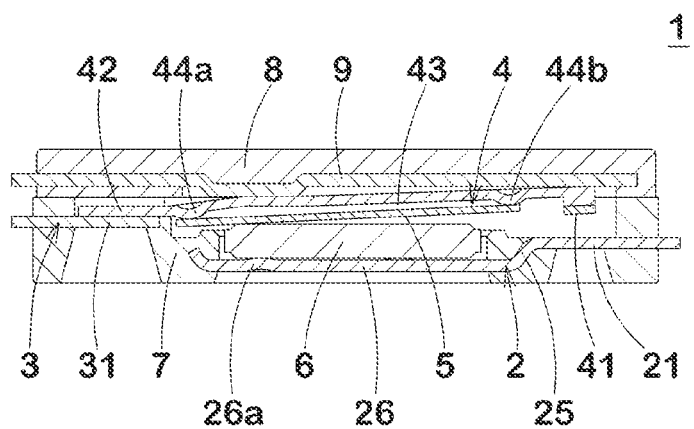
FIG. 3 is a cross-sectional view showing the breaker in its overcharged state or when an abnormality occurs.

FIGS. 1 to 3 show the structure of the breaker.

As shown in FIGS. 1 and 3, the breaker 1 is provided with a pair of terminals 22 and 32 partially exposed to the outside from a case 10.

By electrically connecting the terminals 22 and 32 to an external circuit (not shown), the breaker 1 constitutes a main part of a safety circuit of an electrical equipment.

As shown in FIG. 1, the breaker 1 is composed of
a first terminal piece (fixed piece) 2 having a fixed contact 21 and a terminal 22,
a second terminal piece 3 having a terminal 32,
a movable piece 4 having a movable contact 41 at its tip portion,
a thermally-actuated element 5 which changes its shape according to the temperature change,
a PTC (Positive Temperature Coefficient) thermistor 6,
a first terminal piece 2,
a second terminal piece 3,
a movable piece 4,
a case 10 for accommodating the thermally-actuated element 5 and the PTC thermistor 6 and the like.

The case 10 is composed of a case main body (first resin case) 7, a lid member (second resin case) 8 mounted on an upper surface of the case main body 7, and the like.

The first terminal piece 2 is formed by pressing a metal plate containing copper as a main component for example (in addition, a metal plate such as a copper-titanium alloy, nickel silver, brass or the like), and it is embedded in the case main body 7 by insert molding.

The fixed contact 21 is formed by clading, plating or coating a highly conductive material such as silver, nickel, a nickel-silver alloy, a copper-silver alloy, a gold-silver alloy or the like.

The fixed contact 21 is formed at a position of the first terminal piece 2 facing the movable contact 41, and is exposed to an accommodating recess 73 of the case main body 7 from a part of an opening 73a formed inside the case main body 7. The fixed contact 21 and the terminal 22 are arranged at different heights by a steppedly bent portion (not shown) embedded in the case main body 7.

In the present application, unless otherwise noted, the description is made on the premise that, of the first terminal piece 2, the surface on the side where the fixed contact 21 is formed (namely, a surface on the upper side in FIG. 1) is called as a first surface, and the bottom surface on the opposite side thereto as a second surface. The same applies to other components, e.g. the second terminal piece 3, the movable piece 4, the thermally-actuated element 5, the PTC thermistor 6, the case 10, a cover piece 9 and the like.

The second surface of the terminal 22 is exposed from the bottom wall of the case main body 7 (not shown) in a rectangular shape, and is connected to an external circuit through a technique such as soldering.

In this embodiment, a pair of terminals 22 are arranged side by side in the short direction of the breaker 1.

As shown in FIG. 2, the first terminal piece 2 has a steppedly bent portion 25 bent in a stepped shape (crank shape in the side view), and
a support portion 26 for supporting the PTC thermistor 6.
The steppedly bent portion 25 connects the fixed contact 21 and the support portion 26, and arranges the fixed contact 21 and the support portion 26 at different heights.

The PTC thermistor 6 is placed on convex protrusions (DABO) 26a formed at three positions on the support portion 26, and is supported by the protrusions 26a.

The second terminal piece 3 is formed by pressing a metal plate containing copper or the like as a main component, and is embedded in the case main body 7 by insert molding similarly to the first terminal piece 2.

The second terminal piece 3 has a terminal 32, and a joint portion 31 joined to the movable piece 4.

The joint portion 31 and the terminal 32 are arranged at different heights by its steppedly bent portion (not shown) embedded in the case main body 7.

The joint portion 31 is exposed to the accommodating recess 73 of the case main body 7 from a part of the opening 73b formed inside the case main body 7, and is electrically connected to the movable piece 4.

The second surface of the terminal 32 is exposed from the bottom wall of the case main body 7 (not shown) in a rectangular shape, and is connected to an external circuit through a technique such as soldering.

In this embodiment, a pair of the terminals 32 are arranged side by side in the short direction of the breaker 1.

The movable piece 4 is formed in a plate shape by pressing a metal material containing copper or the like as a main component.

The movable piece 4 is formed in an arm shape symmetrical with respect to the center line in the longitudinal direction.

The movable contact 41 is formed in one end portion of the movable piece 4.

The movable contact 41 is formed on the second surface of the movable piece 4 by a material equivalent to the fixed contact 21, and is joined to the tip end portion of the movable piece 4 by a method such as welding, clading, or crimping.

In the other end portion of the movable piece 4, there is formed a joint portion 42 electrically connected to the joint portion 31 of the second terminal piece 3.

The first surface of the joint portion 31 of the second terminal piece 3 is fixed to the second surface of the joint portion 42 of the movable piece 4, for example, by laser welding.

Laser welding is a welding technique in which works are joined together by irradiating the works (in this embodiment, corresponding to the second terminal piece 3 and the movable piece 4) with laser light and locally melting and solidifying the works.

On the surface of the work irradiated with the laser light, there is formed a laser welding mark having a form different from the welding mark by another welding method (for example, resistance welding using Joule heat).

The movable piece 4 has the elastic portion 43 between the movable contact 41 and the joint portion 42.

The elastic portion 43 extends from the joint portion 42 toward the movable contact 41.

Thereby, the joint portion 42 is provided on the side opposite to the movable contact 41 with the elastic portion 43 interposed therebetween.

The movable piece 4 is fixed by being fixed to the joint portion 31 of the second terminal piece 3 at the joint portion 42, and by elastic deformation of the elastic portion 43, the movable contact 41 formed at the tip end of the elastic portion 43 is pressed toward the fixed contact 21 and contacts therewith, and the first terminal piece 2 and the movable piece 4 become conductive.

Since the movable piece 4 and the second terminal piece 3 are electrically connected at the joint portion 31 and the joint portion 42, the first terminal piece 2 and the second terminal piece 3 become conductive.

In the elastic portion 43, the movable piece 4 is curved or bent by press working.

The degree of curving or bending is not particularly limited as long as the thermally-actuated element 5 can be housed, and may be appropriately set in consideration of the elastic force at the operating temperature and reset temperature, the pressing force of the contact, and the like.

Further, the second surface of the elastic portion 43 is provided with a pair of protrusions (contact portions) 44a and 44b so as to face the thermally-actuated element 5. The protrusions 44a and 44b come into contact with the thermally-actuated element 5, and the deformation of the thermally-actuated element 5 is transmitted to the elastic portion 43 via the protrusions 44a and 44b (see FIGS. 1 and 3).

The thermally-actuated element 5 shifts the state of the movable piece 4 from a conductive state in which the movable contact 41 contacts with the fixed contact 21 to a cut-off state in which the movable contact 41 is separated from the fixed contact 21.

The thermally-actuated element 5 has an initial shape curved in an arc shape, and is formed by laminating thin plate materials having different coefficients of thermal expansion. The curved shape of the thermally-actuated element 5 is reversely warped with a snap motion when it reaches an operating temperature by overheating, and is reset when it becomes below the reset temperature by cooling.

The initial shape of the thermally-actuated element 5 can be provided through a press working.

The material and shape of the thermally-actuated element 5 are not particularly limited as long as the elastic portion 43 of the movable piece 4 is pushed up at the desired temperature owing to the reversely warping motion of the thermally-actuated element 5, and returns to the original by the elastic force of the elastic portion 43.

But, a rectangular shape is desirable in view of the productivity and the efficiency of the reversely warping motion. Further, a rectangular shape close to a square is desirable in order to push up the elastic portion 43 effectively while being compact.

As the materials of the thermally-actuated element 5, two kinds of materials having different thermal expansion rates such as various alloys, for example, copper-nickel-manganese alloy and nickel-chromium-iron alloy on the high expansion rate side, and iron-nickel alloy, nickel silver, brass, stainless steel on the low expansion rate side, are used by being combined and laminated according to the required conditions.

When the movable piece 4 is in the cut-off state, the PTC thermistor 6 provides an electrical conduction between the first terminal piece 2 and the movable piece 4.

The PTC thermistor 6 is disposed between the support portion 26 of the first terminal piece 2 and the thermally-actuated element 5.

That is, the support portion 26 is located just beneath the thermally-actuated element 5 with the PTC thermistor 6 in between.

When the current between the first terminal piece 2 and the movable piece 4 is cut off by the reversely warping motion of the thermally-actuated element 5, this increases the current flowing through the PTC thermistor 6.

As long as the PTC thermistor 6 is a positive temperature coefficient thermistor which can limits its current by its resistance increasing with the temperature rise, its type can be arbitrary selected according to the requirements such as the operating current, operating voltage, operating temperature, and reset temperature. And its material and shape are not particularly limited as long as they do not impair these characteristics.

In the present embodiment, there is used a ceramic sintered body which contains barium titanate, strontium titanate or calcium titanate.

Aside from the ceramic sintered body, so-called polymer PTC in which conductive particles such as carbon are dispersed in a polymer may be used.

The case main body 7 and lid member 8 constituting the case 10 are molded from thermoplastic resins, e.g. flame retardant polyamide, polyphenylene sulfide (PPS), liquid crystal polymer (LCP), polybutylene terephthalate (PBT) and the like having excellent heat resistance.

It may be possible to employ materials other than resins if properties compatible or higher than the above-mentioned resins can be obtained.

The case main body 7 is provided with the accommodating recess 73 which is an internal space accommodating the movable piece 4, the thermally-actuated element 5, the PTC thermistor 6 and the like.

The accommodating recess 73 has the openings 73a, 73b for receiving the movable piece 4, an opening 73c for receiving the movable piece 4 and the thermally-actuated element 5, an opening 73d for receiving the PTC thermistor 6, and the like. The movable piece 4 and the thermally-actuated element 5 which are mounted in the case main body 7 have their edges which are respectively contacted by frames (inner walls) formed inside the accommodating recess 73 and which are guided when the thermally-actuated element 5 is making the reversely warping motion.

In the lid member 8, there is embedded the cover piece 9 by insert molding.

The cover piece 9 is formed in the form of a plate by press working on a metal containing copper or the like as its main component as described above, or a metal such as stainless steel. As shown in FIGS. 2 and 3, the cover piece 9 timely contacts with the first surface of the movable piece 4 to control the movement of the movable piece 4, and at the same time, contributes to miniaturization of the breaker 1 by increasing the rigidity and strength of the lid member 8, consequently, those of the case 10 as a housing.

As shown in FIG. 1, the lid member 8 is attached to the case main body 7 so as to close the openings 73a, 73b, 73c and the like of the case main body 7 in which the first terminal piece 2, the second terminal piece 3, the movable piece 4, the thermally-actuated element 5 and the PTC thermistor 6 and the like have been housed.

The case main body 7 and the lid member 8 are joined by ultrasonic welding for example.

At this time, the jointing is made continuously over the entire circumference of the outer edge portion of each of the case main body 7 and the lid member 8, and thereby the airtightness of the case 10 is improved.

As a result, the internal space of the case 10 provided by the accommodating recess 73 is sealed, and the parts such as the movable piece 4, the thermally-actuated element 5 and the PTC thermistor 6 can be shielded and protected from the atmosphere outside the case 10.

In the present embodiment, the resin is arranged on the first surface side of the cover piece 9 entirely, therefore, the airtightness of the accommodating recess 73 is further enhanced.

FIG. 2 shows the operation of the breaker 1 in the normal charge/discharge state.

In the normal charge/discharge state, the thermally-actuated element 5 maintains its initial shape (before reversely warping) which is convex toward the elastic portion 43.

The cover piece 9 is provided with a protruding portion 91 which comes into contact with a top portion 43a of the movable piece 4 and pushes the top portion 43a toward the thermally-actuated element 5.

By pushing the top portion 43a with the protruding portion 91, the elastic portion 43 is elastically deformed, and the movable contact 41 formed at the tip end of the elastic portion 43 is pushed toward the fixed contact 21 and contacts therewith.

As a result, the first terminal piece 2 and the second terminal piece 3 of the breaker 1 are electrically connected to each other through the elastic portion 43 of the movable piece 4.

It may be possible to configure such that the movable piece 4, the thermally-actuated element 5, the PTC thermistor 6, and the first terminal piece 2 are electrically connected as a circuit by the contact between the elastic portion 43 of the movable piece 4 and the thermally-actuated element 5. The current flowing through the PTC thermistor 6 is however substantially negligible as compared to the amount flowing through the fixed contact 21 and the movable contact 41 since the resistance of the PTC thermistor 6 is very high as compared with the resistance of the movable piece 4.

FIG. 3 shows the operation of the breaker 1 under an overcharge condition, an abnormal state and the like.

The thermally-actuated element 5 becoming a high temperature state by overcharge or abnormality and reached to the operating temperature, warps reversely, and the elastic portion 43 of the movable piece 4 is pushed up to separate the fixed contact 21 and the movable contact 41.

The operating temperature of the thermally-actuated element 5 at which the thermally-actuated element 5 is deformed in the inside of the breaker 1 and pushes up the movable piece 4, is from 70 to 90 degrees C., for example.

At this time, the current flowing between the fixed contact 21 and the movable contact 41 is cut off, and a slight leakage current will flow through the thermally-actuated element 5 and the PTC thermistor 6.

As far as such leakage current flows, the PTC thermistor 6 continues to generate heat and keeps the thermally-actuated element 5 in the reversely warped state to greatly increase the resistance, therefore, the current does not flow through the path between the fixed contact 21 and the movable contact 41, and only the above described small leakage current flows (constituting the self-holding circuit).

This leakage current can be utilized for other functions of a safety device.

In the present embodiment, even in the situation where the thermally-actuated element 5 reached to the operating temperature is reversely warped, the contact between the top portion 43a and the protruding portion 91 is maintained. Thereby, the movable piece 4 is pushed up with the contact point between the top portion 43a and the protruding portion 91 as a fulcrum, and the distance between the fixed contact 21 and the movable contact 41 is easily maintained.

Further, since the movable piece 4 is supported by the protruding portion 91, and the protruding portion 91 bears a part of the pushing force of the thermally-actuated element 5, the force applied to the joint portion 42 of the movable piece 4 is suppressed, and a detachment of the joint portion 42 from the joint portion 31 is suppressed.

As shown in FIG. 1, the case main body 7 is provided with a first fixing surface 75 to be fixed to the lid member 8. The first fixing surface 75 is formed continuously around the openings 73a, 73b and 73c.

In the present embodiment, the first fixing surface 75 is formed as a flat surface continued along the outer edge of the case main body 7 over the entire circumference of the case main body 7.

Figure 4:
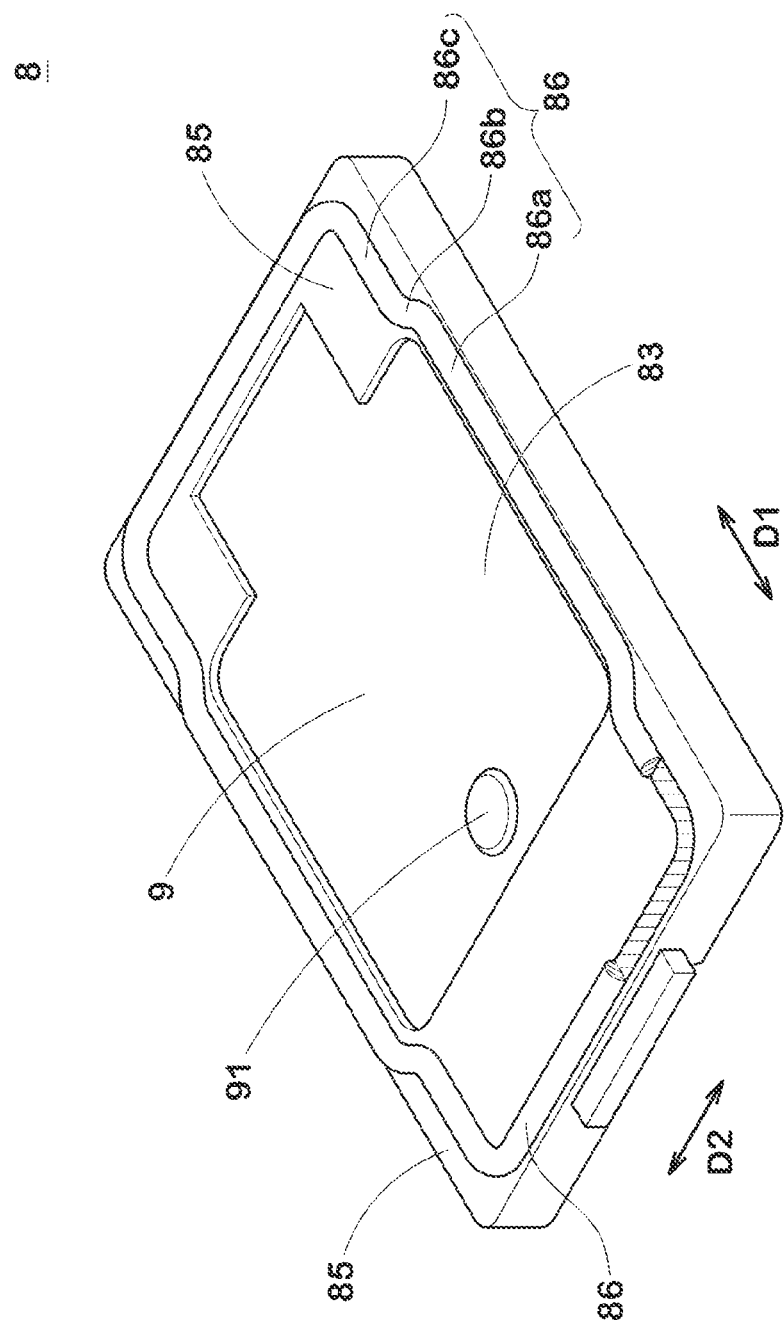
FIG. 4 is a perspective view of a lid member constituting the breaker.

FIG. 4 is a perspective view of the lid member 8 as viewed from the second surface side facing the movable piece 4. The lid member 8 is provided with an opening 83 for exposing the cover piece 9 to the internal space of the case 10, and a second fixing surface 85 to be fixed to the case main body 7.

The opening 83 of the present embodiment is formed in a shape corresponding to the openings 73a and 73c of the case main body 7 on the second surface side of the lid member 8.

That is, it is desirable that the outer edge of the opening 83 coincides with the outer edges of the openings 73a and 73c when viewed in the thickness direction of the cover piece 9. Thereby, it is possible to increase the area where the first fixing surface 75 and the second fixing surface 85 come into contact with each other.

The second fixing surface 85 is formed so as to face the first fixing surface 75 when the lid member 8 is attached to the case main body 7.

In the present embodiment, the second fixing surface 85 is formed continuously around the opening 83 along the outer edge of the lid member 8 over the entire circumference of the lid member 8.

The second fixing surface 85 is provided with a protruding portion 86 which protrudes toward the first fixing surface 75.

The protruding portion 86 extends along the outer edge of the lid member 8 in the form of a rib.

In FIG. 4, the protruding portion 86 is partially cut out.

In the protruding portion 86 extending in the longitudinal direction of the movable piece 4, its cross section in the short direction of the movable piece 4 is arcuate.

In the protruding portion 86 extending in the short direction of the movable piece 4, its cross section in the longitudinal direction of the movable piece 4 is arcuate.

Figure 5:
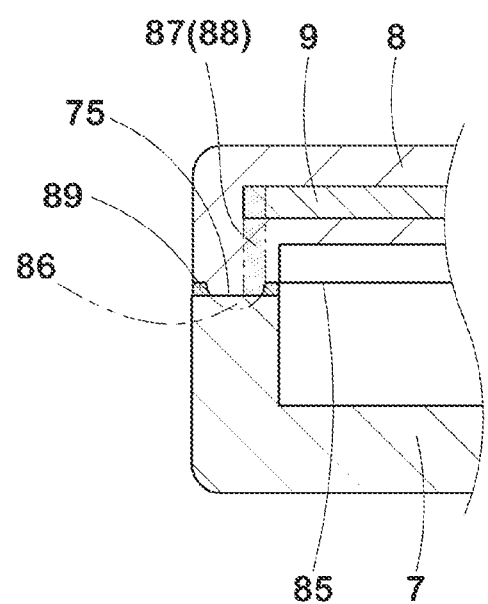
FIG. 5 is a cross-sectional view of a welded portion of the lid member and a case main body constituting the breaker.

FIG. 5 shows a cross section of a welded portion of the case main body 7 and the lid member 8.

In the figure, the protruding portion 86 before melted is indicated by an imaginary line of a chain double-dashed line.

By providing the protruding portion 86 on the second fixing surface 85, when the lid member 8 is set on the case main body 7, the top of the protruding portion 86 first comes into contact with the first fixing surface 75.

Thereby, during ultrasonic welding, the pressure acting on the top of the protruding portion 86 increases, and the frictional heat generated between the top of the protruding portion 86 and the first fixing surface 75 increases.

As a result, the resin of the protruding portion 86 is easily melted, and the fixation between the first fixing surface 75 and the second fixing surface 85 becomes good.

In the above fixing step, the resin 89 resulting mainly from the melted resin of the protruding portion 86, flows into between the first fixing surface 75 and the second fixing surface 85, on both sides of the protruding portion 86, and fills up the gap therebetween.

Figure 6:
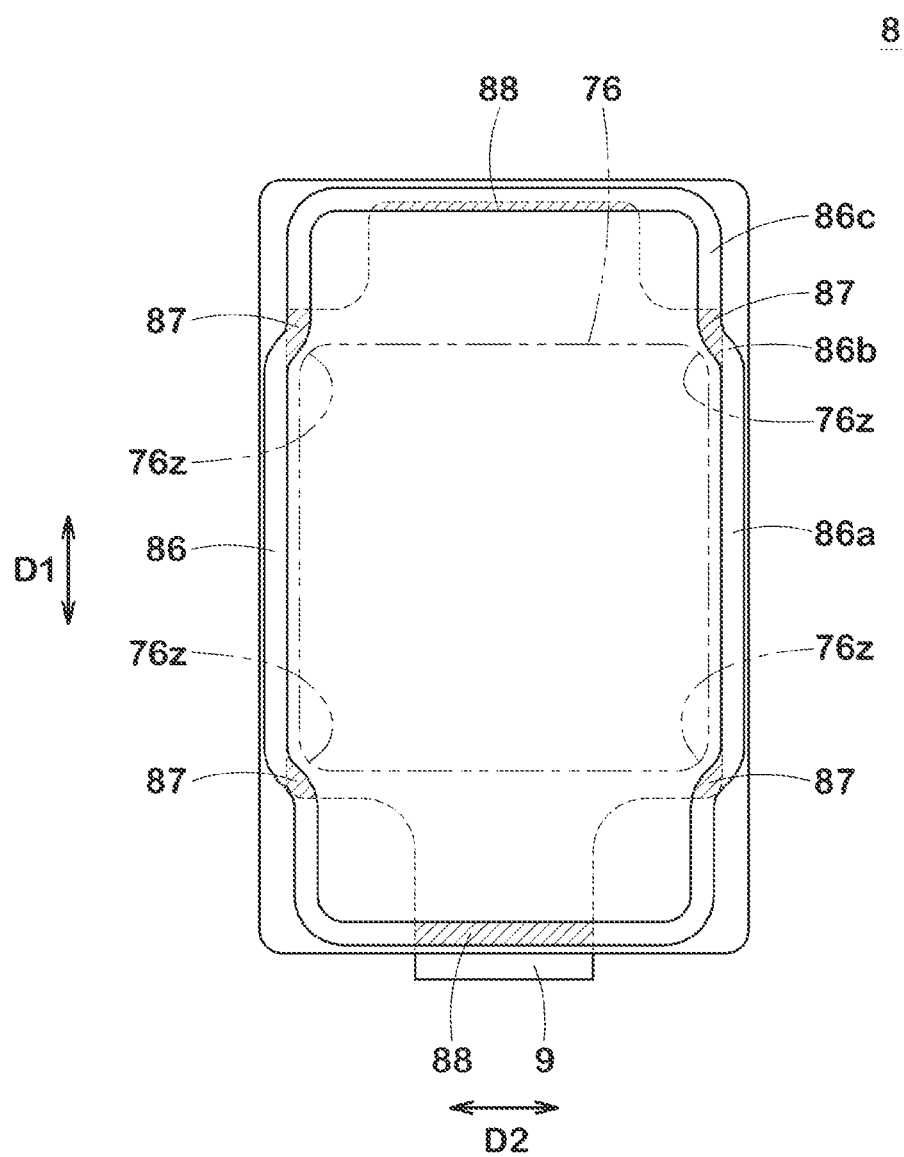
FIG. 6 is a bottom view of the lid member.

FIG. 6 is a bottom view of the lid member 8 as viewed from the second surface side.

The plate-shaped cover piece 9 embedded in the lid member 8 reinforces the lid member 8 and suppresses the bending of the lid member 8 even during ultrasonic welding.

The lid member 8 has regions 87 in which the protruding portion 86 and the cover piece 9 overlap each other in the bottom view. That is, the protruding portion 86 and the cover piece 9 are at least partially overlapped with each other in the plan view when viewed in the thickness direction of the cover piece 9.

Thereby, when the case main body 7 and the lid member 8 are fixed, the bending of the lid member 8 in the regions 87 is reduced, and the decrease in the pressure acting on the top of the protruding portion 86 is suppressed, Thus, even better fixation between the first fixing surface 75 and the second fixing surface 85 can be obtained.

As shown in FIG. 1, of the openings 73a, 73b and 73c, the opening 73c is a rectangular area 76 formed in a rectangular shape in the plan view.

Here, the "rectangular area" is not limited to a perfect rectangle, and includes a form in which the corners are rounded like a fillet.

In FIG. 6, the rectangular area 76 is indicated by a chain double-dashed line.

As shown in the figure, in the vicinities of the four corners 76z of the rectangular area 76 and on the outside of the rectangular area 76 in the bottom view, the lid member 8 has the regions 87 in which the protruding portion 86 and the cover piece 9 are overlapped with each other.

That is, the protruding portion 86 and the cover piece 9 overlap with each other in the regions 87 adjacent to the outer sides of the four corners 76z of the rectangular area 76 in the plan view. Thereby, when the case main body 7 and the lid member 8 are fixed, the bending of the lid member 8 is effectively suppressed in the regions 87 adjacent to the outer sides of the four corners 76z.

Therefore, the case main body 7 and the lid member 8 are firmly fixed in the positions around the opening 73c which generally tends to have insufficient rigidity. Thus, it becomes possible to easily increase the rigidity of the case 10.

As shown in FIGS. 1, 4 and 6, the lid member 8 is formed in a rectangular shape longer in the longitudinal direction D1 of the movable piece 4 in the plan view.

The protruding portion 86 has first portions 86a extending linearly in parallel with the long sides of the lid member 8 along the opening 73c, and second portions 86b continued from the first portions 86a and bent inward in the short direction D2 of the movable piece 4 in the regions 87 adjacent to the four corners 76z.

By the second portions 86b bent inward from the first portions 86a, the case main body 7 and the lid member 8 are more firmly fixed around the opening 73c.

It is desirable that the second portion 86b at least partially overlaps with the cover piece 9 in the plan view. With such configuration, the case main body 7 and the lid member 8 are more firmly fixed around the opening 73c.

The protruding portion 86 further has third portions 86c continued from the second portions 86b and extending linearly in parallel with the first portions 86a.

The third portion 86c is disposed inward in the short direction D2 with respect to the first portion 86a.

In the regions 87 adjacent to the four corners 76z, the first portion 86a, the second portion 86b and the third portion 86c form the protruding portion 86 with a zigzag meandering shape. Thereby, the protruding portion 86 is densely arranged in the regions 87 adjacent to the four corners 76z, and the case main body 7 and the lid member 8 are more firmly fixed to each other.

It is desirable that the third portion 86c is at least partially overlapped with the cover piece 9 in the plan view. In the present embodiment, a section on the second portion 86b side, of the third portion 86c arranged in the vicinity of the terminal 22 overlaps with the cover piece 9 in the plan view. With such configuration, the case main body 7 and the lid member 8 are more firmly fixed around the opening 73c.

As shown in FIG. 6, the lid member 8 has regions 88 in which the protruding portion 86 and the cover piece 9 overlap with each other in the vicinity of both ends in the longitudinal direction D1, of the lid member 8 in the bottom view.

That is, the protruding portion 86 and the cover piece 9 overlap with each other in the regions 88 near both ends of the lid member 8 in the longitudinal direction D1 in the plan view.

Thereby, in cooperation with the overlap between the protruding portion 86 and the cover piece 9 in the above-mentioned regions 87, the case main body 7 and the lid member 8 are more firmly fixed to each other.

The breaker 1 of the first invention is not limited to the configuration of the above embodiment, and can be modified into various embodiments. In other words, only need is that the breaker 1 is a breaker 1 comprising at least a fixed contact 21, a movable piece 4, which has an elastic portion 43 formed in a plate shape and elastically deformable, and a movable contact 41 at one end of the elastic portion 43, and which is for pressing the movable contact 41 against the fixed contact 21, a thermally-actuated element 5 deforming with a change in the temperature so as to shift the movable piece 4 from a conduction state in which a movable contact 41 contacts with the fixed contact 21 to a cut-off state in which the movable contact 41 is separated from the fixed contact 21, a case main body 7 having an opening 73c for housing the movable piece 4 and the thermally-actuated element 5, a lid member 8 attached to the case main body 7 to close the opening 73c, and a plate-shaped cover piece 9 embedded in the lid member 8, wherein the case main body 7 is provided with a first fixing surface 75 formed continuously around the opening 73c and fixed to the lid member 8, the lid member 8 is provided with a second fixing surface 85 continuously formed so as to face the first fixing surface 75, and fixed to the case main body 7, the second fixing surface 85 is provided with a protruding portion 86 protruding toward the first fixing surface 75, and the protruding portion 86 and the cover piece 9 are at least partially overlapped with each other in the plan view viewed in the thickness direction of the cover piece 9.

For example, the outer edge of the case main body 7 may be formed along the protruding portion 86.

More specifically, in the vicinities of the terminals 22 and 32, the side wall 74 (see FIG. 1) of the case main body 7 may be recessed inward in the short direction D2 along the second portions 86b and the third portions 86c.

Similarly, the outer edge of the lid member 8 may be formed along the protruding portion 86.

With such configuration, the width dimension of the breaker 1 in the short direction D2 can be controlled while ensuring the amount of protrusion of the terminals 22 and 32 from the side wall 74.

Second Invention

Figure 7:
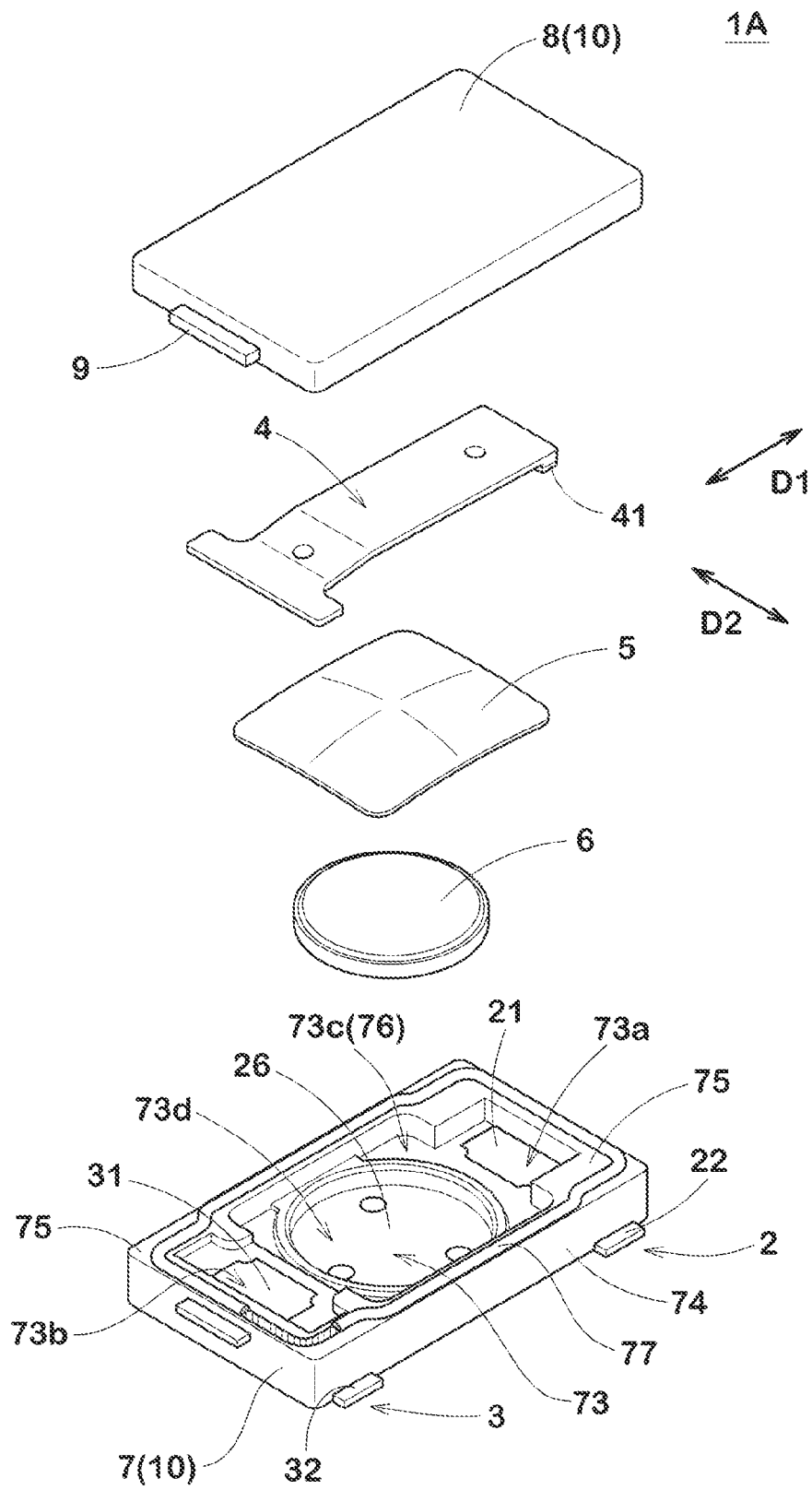
FIG. 7 is a perspective view of a breaker as an embodiment of the second invention showing a schematic configuration before assembled.

FIG. 7 shows the configuration of a breaker 1A as an embodiment of the second invention, which is a modification of the breaker 1 shown in FIGS. 1 to 6.

As to the part of the breaker 1A not described below, the above-described configurations of the breaker 1 can be adopted therefor.

The breaker 1A is different from the breaker 1 in that a protruding portion 77 is provided on the first fixing surface 75 of the case main body 7.

According to this, the protruding portion 86 of the lid member 8 is not provided.

The protruding portion 77 protrudes toward the second fixing surface 85.

The protruding portion 77 extends along the outer edge of the case main body 7 in the form of a rib.

In FIG. 7, the protruding portion 77 is partially cut out.

In the protruding portion 77 extending in the longitudinal direction of the movable piece 4, its cross section in the short direction of the movable piece 4 is arcuate.

In the protruding portion 77 extending in the short direction of the movable piece 4, its cross section in the longitudinal direction of the movable piece 4 is arcuate.

Similar to the breaker 1 above, the resin of the protruding portion 77 is easily melted when the case main body 7 and the lid member 8 are welded, and the fixation between the first fixing surface 75 and the second fixing surface 85 becomes good.

Further, similar to the breaker 1 above, in the fixing step, the resin resulting mainly from the melted resin of the protruding portion 77 flows into between the first fixing surface 75 and the second fixing surface 85, on the protruding portion 77 side, and fills up the gap therebetween.

Figure 8:
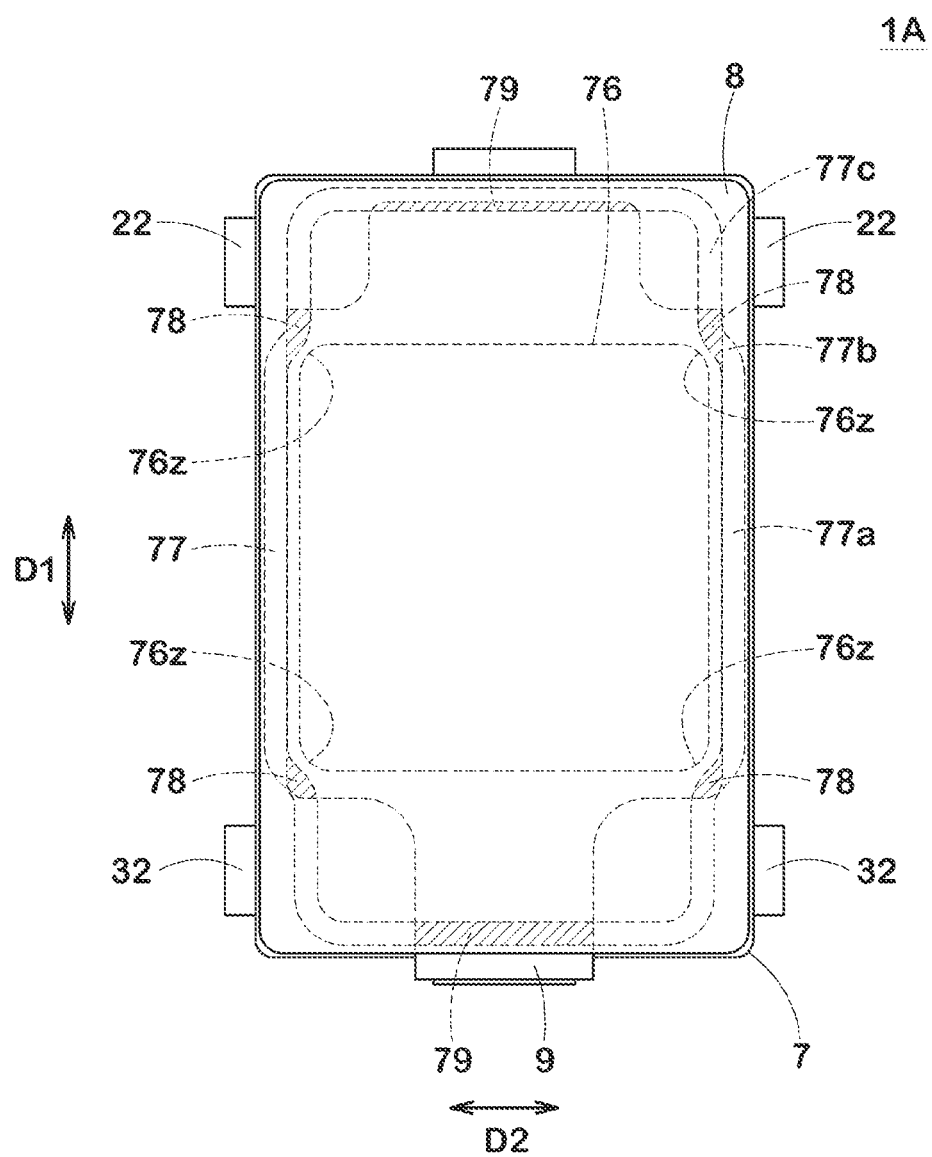
FIG. 8 is a plan view of the breaker of FIG. 7.

FIG. 8 shows a plan view of the breaker 1 [sic] as viewed in the thickness direction of the cover piece 9.

The case main body 7 has regions 78 in which the protruding portion 77 and the cover piece 9 are overlapped with each other in the plan view.

That is, the protruding portion 77 and the cover piece 9 are at least partially overlapped with each other in the plan view when viewed in the thickness direction of the cover piece 9. Thereby, when the case main body 7 and the lid member 8 are fixed, the bending of the lid member 8 in the regions 78 is reduced, the decrease in the pressure acting on the top of the protruding portion 77 is suppressed, and even better fixation can be obtained between the first fixing surface 75 and the second fixing surface 85.

As shown in FIG. 8, in the vicinities of the four corners 76z of the rectangular area 76 and on the outside of the rectangular area 76 in the plan view, the case main body 7 has the regions 78 in which the protruding portion 77 and the cover piece 9 are overlapped with each other.

Thereby, when the case main body 7 and the lid member 8 are fixed, the bending of the lid member 8 is effectively suppressed in the regions 78 adjacent to the outer sides of the four corners 76z.

As shown in FIGS. 7 and 8, the case main body 7 is formed in a rectangular shape longer in the longitudinal direction D1 of the movable piece 4 in the plan view.

The protruding portion 77 has first portions 77a extending linearly along the opening 73c in parallel with the long sides of the case main body 7, and second portions 77b continued from the first portions 77a and bent inward in the short direction D2 of the movable piece 4 in the regions 78 adjacent to the four corners 76z.

Owing to the second portions 77b bent inward from the first portions 77a, the case main body 7 and the lid member 8 are more firmly fixed to each other around the opening 73c.

It is desirable that the second portions 77b are at least partially overlapped with the cover piece 9 in the plan view. With such configuration, the case main body 7 and the lid member 8 are more firmly fixed around the opening 73c.

Further, the protruding portion 77 has third portions 77c continued from the second portions 77b and extending linearly in parallel with the first portions 77a.

The third portions 77c are disposed inward in the short direction D2 with respect to the first portions 77a.

In the regions 78 adjacent to the four corners 76z, the first portion 77a, the second portion 77b and the third portion 77c form the protruding portion 77 with a zigzag meandering shape. Thereby, the protruding portion 77 is densely arranged in the regions 78 adjacent to the four corners 76z, and the case main body 7 and the lid member 8 are more firmly fixed to each other.

It is desirable that the third portions 77c are at least partially overlapped with the cover piece 9 in the plan view. In the present embodiment, sections on the second portion 77b side of the third portions 77c arranged in the vicinities of the terminals 22 are overlapped with the cover piece 9 in the plan view.

with such configuration, the case main body 7 and the lid member 8 are more firmly fixed around the opening 73c.

As shown in FIG. 8, in the vicinities of both ends of the case main body 7 in the longitudinal direction D1 in the plan view, the case main body 7 has regions 79 in which the protruding portion 77 and the cover piece 9 are overlapped with each other. Thereby, in cooperation with the overlap between the protruding portion 77 and the cover piece 9 in the above-mentioned regions 78, the case main body 7 and the lid member 8 are more firmly fixed to each other.

The breaker 1A of the second invention is not limited to the configuration of the above embodiment, and can be modified into various embodiments. In other words, only need is that the breaker 1A is a breaker 1 comprising at least a fixed contact 21, a movable piece 4, which has an elastic portion 43 formed in a plate shape and elastically deformable, and a movable contact 41 at one end of the elastic portion 43, and which is for pressing the movable contact 41 against the fixed contact 21, a thermally-actuated element 5 deforming with a change in the temperature so as to shift the movable piece 4 from a conduction state in which a movable contact 41 contacts with the fixed contact 21 to a cut-off state in which the movable contact 41 is separated from the fixed contact 21, a case main body 7 having an opening 73c for housing the movable piece 4 and the thermally-actuated element 5, a lid member 8 attached to the case main body 7 to close the opening 73c, and a plate-shaped cover piece 9 embedded in the lid member 8, wherein the case main body 7 is provided with a first fixing surface 75 formed continuously around the opening 73c and fixed to the lid member 8, the lid member 8 is provided with a second fixing surface 85 continuously formed so as to face the first fixing surface 75, and fixed to the case main body 7, the first fixing surface 75 is provided with a protruding portion 77 protruding toward the second fixing surface 85, and the protruding portion 77 and the cover piece 9 are at least partially overlapped with each other in the plan view viewed in the thickness direction of the cover piece 9.

For example, the outer edge of the case main body 7 may be formed along the protruding portion 77.
More specifically, in the vicinities of the terminals 22 and 32, the side wall 74 of the case main body 7 may be recessed inward in the short direction D2 along the second portions 77b and the third portions 77c.
Similarly, the outer edge of the lid member 8 may be formed along the protruding portion 77.
With such configuration, the width dimension of the breaker 1A in the short direction D2 can be controlled while ensuring the amount of protrusion of the terminals 22 and 32 from the side wall 74.

Further, the first invention and the second invention may be applied to a form in which the second terminal piece 3 and the movable piece 4 are integrally formed, for example, as shown in the publication WO2011/105175.

Further, the first invention and the second invention may be applied to a form in which the terminal 22 or the like protrudes in the longitudinal direction of the case as shown in the same publication.

The breakers 1 and 1A of the first invention and the second invention have a self-holding circuit by the PTC thermistor 6, but the inventions can be applied to even a form in which such configuration is omitted.

Further, the breakers 1 and 1A of the first invention and the second invention can be widely applied to a secondary battery pack, a safety circuit for an electrical equipment, and the like.

Figure 9:
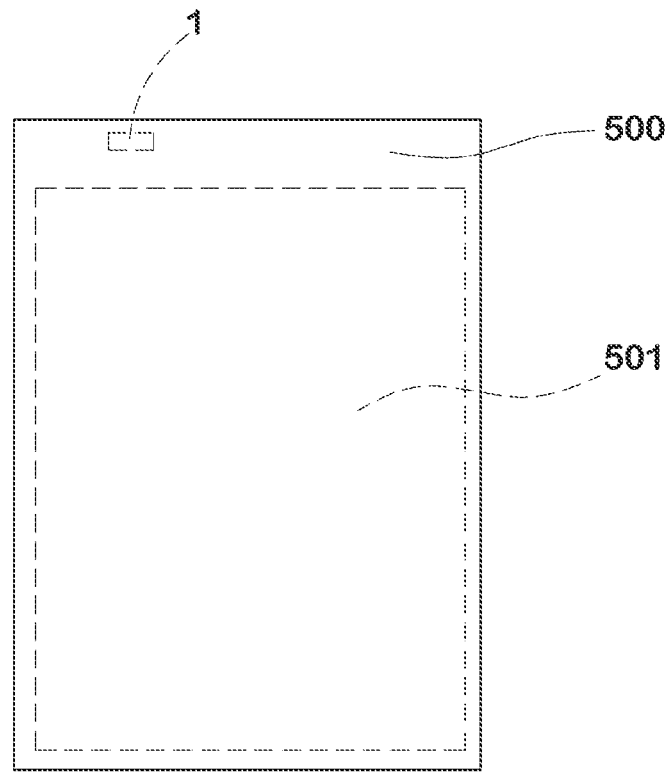
FIG. 9 is a plan view showing a configuration of a secondary battery pack provided with the breaker according to the present invention.

FIG. 9 shows the secondary battery pack 500. The secondary battery pack 500 comprises a secondary battery 501, the breaker 1 provided in the output terminal circuit of the secondary battery 501, and the like.

Figure 10:
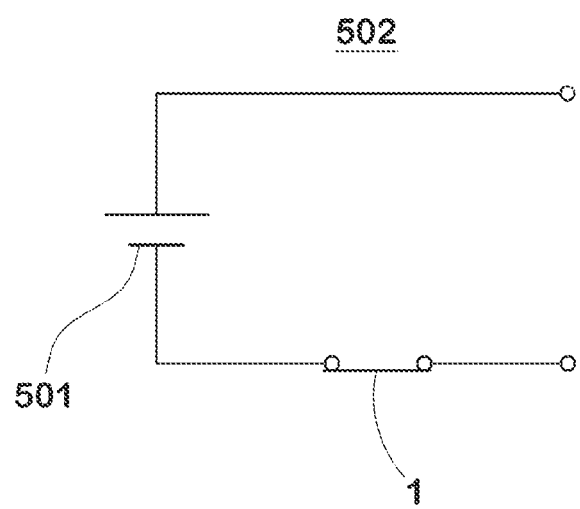
FIG. 10 is a circuit diagram of a safety circuit including the breaker according to the present invention.

FIG. 10 shows a safety circuit 502 for an electrical equipment. The safety circuit 502 comprises the breaker 1 provided in series in the output circuit of the secondary battery 501.

A part of the safety circuit 502 may be constituted by a cable including a connector equipped with the breaker.

DESCRIPTION OF THE REFERENCE SIGNS

1: breaker
4: movable piece
5: thermally-actuated element
7: case main body
8: lid member
9: cover piece
21: fixed contact
41: movable contact
43: elastic portion
73a: opening
73b: opening
73c: opening
75: first fixing surface
76: rectangular area
76z: four corners
77: protruding portion
77a: first portion
77b: second portion
77c: thirds portion
78: region
79: region
85: second fixing surface
86: protruding portion
86a: first portion
86b: second portion
86c: thirds portion
87: region
88: region
501: secondary battery
502: safety circuit

The invention claimed is:

1. A breaker provided with:
a fixed contact;
a movable piece, which has an elastic portion formed in a plate shape and elastically deformable, and a movable contact formed in one end portion of the elastic portion, and which is for pressing the movable contact against the fixed contact;
a thermally-actuated element deforming with a change in temperature so as to shift the movable piece from a conduction state in which the movable contact contacts with the fixed contact to a cut-off state in which the movable contact is separated from the fixed contact;
a first resin case having an opening for housing the movable piece and the thermally-actuated element;
a second resin case mounted on the first resin case in order to close the opening; and
a plate-shaped cover piece embedded in the second resin case,
wherein
the first resin case is provided with a first fixing surface fixed to the second resin case, and formed continuously around the opening,
the second resin case is provided with a second fixing surface fixed to the first resin case, and formed continuously facing the first fixing surface,
the second fixing surface is provided with a protruding portion protruding toward the first fixing surface, and
the protruding portion and the plate-shaped cover piece are at least partially overlapped with each other in a plan view of the plate-shaped cover piece viewed in its thickness direction,
wherein
the opening includes a rectangular area which is formed in a rectangular shape in said plan view, and
the protruding portion and the plate-shaped cover piece are overlapped with each other in regions which are adjacent to four corners of the rectangular area on outer sides thereof in the plan view,
wherein
the second resin case is formed in a rectangular shape which is longer in a longitudinal direction of the movable piece in the plan view, and
the protruding portion includes:
first portions extending linearly along the opening in parallel with long sides of the second resin case,
second portions continued from the first portions, and bent inward in a short direction of the movable piece in the above-said adjacent regions, and third portions continued from the second portions, and disposed inward in the short direction than the first portions, and extending linearly in parallel with the first portions.

2. The breaker as set forth in claim 1, wherein the second portions and the plate-shaped cover piece are overlapped with each other in the plan view.

3. A safety circuit for electrical equipment, which comprises the breaker as set forth in claim 1.

4. A secondary battery pack, which comprises the breaker as set forth in claim 1.

5. A breaker provided with:
a fixed contact;
a movable piece, which has an elastic portion formed in a plate shape and elastically deformable, and a movable contact formed in one end portion of the elastic portion, and which is for pressing the movable contact against the fixed contact;
a thermally-actuated element deforming with a change in temperature so as to shift the movable piece from a conduction state in which the movable contact contacts with the fixed contact to a cut-off state in which the movable contact is separated from the fixed contact;
a first resin case having an opening for housing the movable piece and the thermally-actuated element;
a second resin case mounted on the first resin case in order to close the opening; and
a plate-shaped cover piece embedded in the second resin case,
wherein
the first resin case is provided with a first fixing surface fixed to the second resin case, and formed continuously around the opening,
the second resin case is provided with a second fixing surface fixed to the first resin case, and formed continuously facing the first fixing surface,
the first fixing surface is provided with a protruding portion protruding toward the second fixing surface, and
the protruding portion and the plate-shaped cover piece are at least partially overlapped with each other in a plan view of the plate-shaped cover piece viewed in its thickness direction,
wherein
the opening includes a rectangular area which is formed in a rectangular shape in said plan view, and
the protruding portion and the plate-shaped cover piece are overlapped with each other in regions which are adjacent to four corners of the rectangular area on outer sides thereof in the plan view,
wherein
the second resin case is formed in a rectangular shape which is longer in a longitudinal direction of the movable piece in the plan view, and
the protruding portion includes:
first portions extending linearly along the opening in parallel with long sides of the second resin case,
second portions continued from the first portions, and bent inward in a short direction of the movable piece in the above-said adjacent regions, and
third portions continued from the second portions, and disposed inward in the short direction than the first portions, and extending linearly in parallel with the first portions.

6. The breaker as set forth in claim 5, wherein the second portions and the plate-shaped cover piece are overlapped with each other in the plan view.

7. A safety circuit for electrical equipment, which comprises the breaker as set forth in claim 5.

8. A secondary battery pack, which comprises the breaker as set forth in claim 2.

* * * * *